United States Patent
King et al.

(12)

(10) Patent No.: US 6,252,592 B1
(45) Date of Patent: *Jun. 26, 2001

(54) SYSTEMS, METHODS AND COMPUTER PROGRAM PRODUCTS FOR SCANNING GRAPHICALLY REPRESENTED ELEMENTS

(75) Inventors: Dennis D. King, Cary; Scott M. Consolatti, Raleigh, both of NC (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/881,425

(22) Filed: Jun. 24, 1997

(51) Int. Cl.[7] .................................. G06F 9/00; G06F 3/14
(52) U.S. Cl. ............................................. 345/339; 345/333
(58) Field of Search ................................... 345/329, 333, 345/335, 340, 334, 350, 337

(56) References Cited

U.S. PATENT DOCUMENTS

| 5,619,636 | * | 4/1997 | Sweat et al. ........................ 345/348 |
| 5,815,149 | * | 9/1998 | Mutschler, III et al. ............. 345/335 |
| 5,844,554 | * | 12/1998 | Geller et al. ......................... 345/333 |
| 5,884,306 | * | 3/1999 | Bliss et al. ........................... 345/333 |

OTHER PUBLICATIONS

Method For Tab Movement Management IBM Tachnical Disclosure Bulletin Sep. 1993.*

Hoose, R.H., et al., Method for Tab Movement Management, *IBM Tachnical Disclosure Bulletin*, vol. 35, No. 9B, pp. 33–34 (Sep. 1993).

Cox, P.H., et al., Grouping Objects for Tabbing and Cursoring in Visual Programming, *IBM Tachnical Disclosure Bulletin*, vol. 38, No. 5, pp. 561–563 (May 1995).

* cited by examiner

*Primary Examiner*—Raymond J. Bayerl
*Assistant Examiner*—Cao H. Nguyen
(74) *Attorney, Agent, or Firm*—Myers Bigel Sibley & Sajovec; A. Bruce Clay

(57) ABSTRACT

Systems, methods and computer program products enable automatic tab scanning of graphically represented elements in program applications. Once a developer has designed a user interface for a program application having a tabbing order representing the sequence in which the visual elements in an application will receive focus when the tab key is selected by an end user, the visual elements may be automatically scanned to view, verify and modify the tabbing order of the visual elements, and the attributes and attribute values associated with each visual element. An entire sequence of visual elements, and the attributes and attribute values corresponding to each visual element, may be automatically scanned one at a time without requiring developer selection of the next visual element in the sequence defined by the tabbing order. The automatic tabbing interval which defines the length of time that each visual element receives focus may be modified by the developer to permit additional time for viewing, verifying and modifying the visual element, the location of the visual element within the sequence defined by the tabbing order, and/or the attributes and attribute values associated with the visual element having focus in the work space. As a result of the present invention, a developer can easily view, comprehend and modify the tabbing order of visual elements, and associated attributes and attribute values, for an application being developed by the developer.

29 Claims, 7 Drawing Sheets

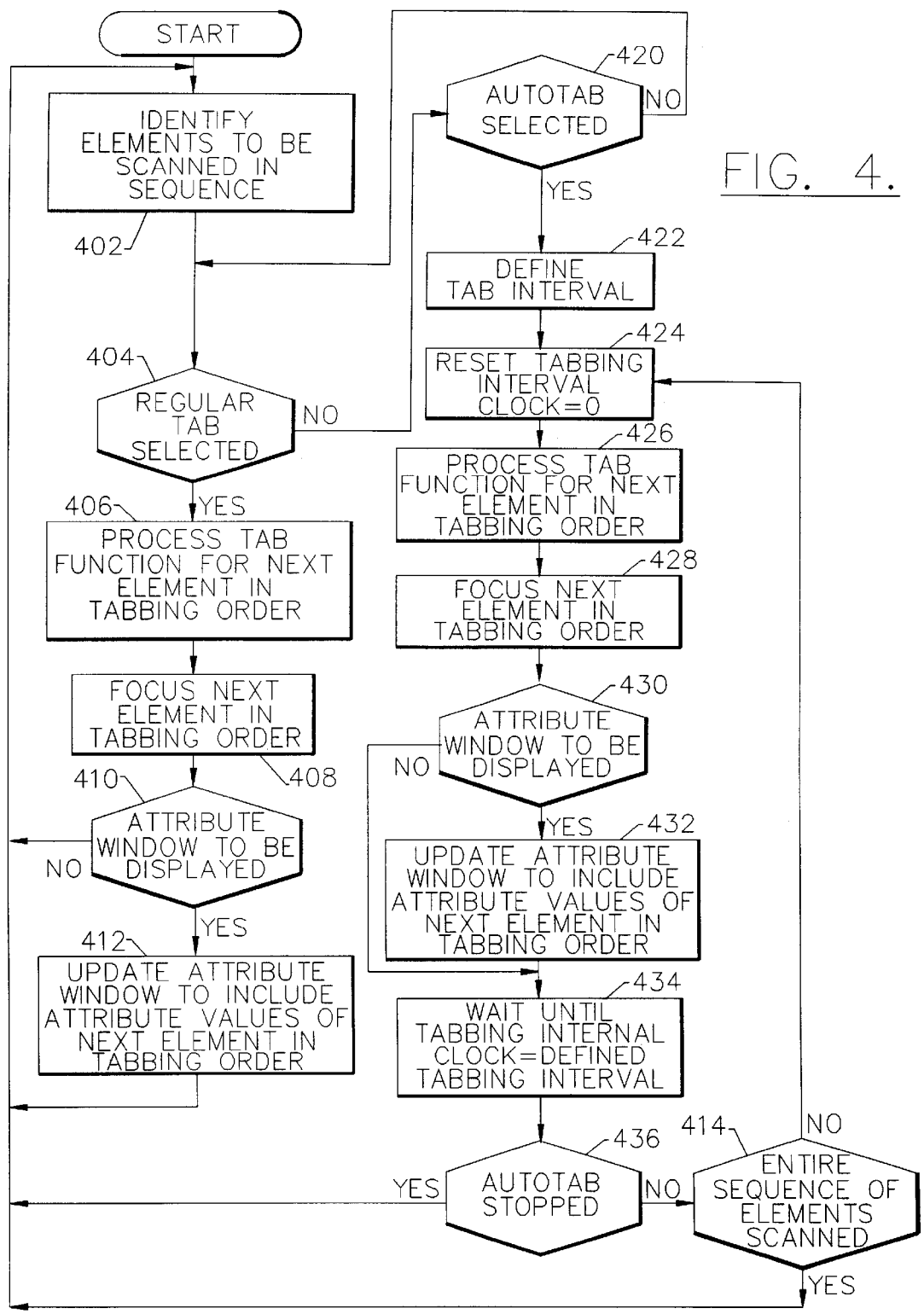

SYSTEMS, METHODS AND COMPUTER PROGRAM PRODUCTS FOR SCANNING GRAPHICALLY REPRESENTED ELEMENTS

FIELD OF THE INVENTION

This invention relates to systems, methods and computer program products, and more particularly, to systems, methods and computer program products used in developing computer program applications.

BACKGROUND OF THE INVENTION

Increases in processing capability and decreases in the cost of personal computers has led to the proliferation of personal computers in all aspects of society. Personal computers are utilized in schools, homes and in businesses. Furthermore, with the decreased costs of personal computers, it has become more feasible from a cost perspective to use computers for tasks, and to carry out functions, which were previously done without the use of computers.

Overview—Graphical User Interfaces

The proliferation of computers throughout numerous aspects of life has resulted in efforts to make the use of computers more intuitive. These efforts have caused, at least in part, a trend to include graphical user interfaces in computer program applications as well as in computer program application development tools. Examples of operating systems which provide graphical user interfaces include IBM® OS/2®, Apple® System 7®, and Microsoft® Windows® operating systems. These operating systems all rely on a "window like" work space for applications, operating system information, such as directory information, and program groupings. Multiple windows may be displayed on the screen of a computer display device simultaneously in what is often referred to as a "desktop." Windows within a desktop are defined by a border which surrounds the window and may also include a title bar and in some cases a series of menu choices which may be implemented in "pull down" menu form and used to manage the appearance and contents of the window. In combination with a pointing device, such as a mouse, windows may be independently moved and resized by "dragging" a border to a new location.

As is well known to those having skill in the art, operating systems and applications operate on a processor which may be a mainframe computer, minicomputer, personal computer, or other hardware platform. Referring to FIG. 1, computing environment 100 generally includes a processing unit 110 and a volatile data storage device 120, typically random access memory (RAM), for providing a working storage for active data and intermediate results. Data in RAM is erased when power to the data processor is removed or a new user session is begun.

Computing environments also include a nonvolatile data storage device 130 for permanent storage of objects. Such a device 130 may be a direct access storage device (DASD), a disk file, a tape file, or erasable optical disk or other well-known device. A display terminal 140 including a cathode ray tube (CRT) or other display, a keyboard and a mouse generally is also operationally connected to the processing unit.

In recent years, many computer program applications have been developed using visual tools which take advantage of graphical user interfaces. The applications which are developed using these visual tools include those applications which themselves have user interaction, and therefore often include graphical user interfaces. Oftentimes, these user interfaces are implemented in a windows environment. The applications may be developed for use in network environments, distributed systems environments, or on stand-alone personal computers.

As part of the application development process, the developer must design and implement the user interface for the application. Thus, the developer uses visual tools to not only select the type of individual user interface element or other component to be included in an application ("visual element") but also the location of the visual element on the user interface, and any other attributes or properties that are to be associated with the particular element. Visual elements may include, for example, field labels, entry fields, and push buttons. Examples of visual elements are illustrated in FIG. 2 and include the field label "name", the entry field adjacent to the field label "name" and the two push buttons labeled "Add" and "Delete." Visual tools typically have a window where they display the value of properties that are associated with a visual element that has been selected by the developer.

Visual elements of a graphical user interface generally are displayed to a user of the application, and are enabled for access by a user in a specific order. This order may be referred to as the "tabbing" order. Thus, "tabbing" order may be defined as the sequence in which visual elements of a user interface for an application will receive "focus" when the "tab" key is pressed by the user. The tabbing order of the elements for an application impacts the ability of an end user of the application to use the application, generally, and, more particularly, impacts the end user's ability to quickly navigate among the visual elements versus multi-step movements using a mouse to cause focus or selection change among the visual elements. Generally, by default, the tabbing order is the order in which the elements were placed on the user interface by the developer during creation of the application. Often, an application developer changes the tabbing order from its initial setting.

Development of Graphical User Interfaces

An application developer faces a number of problems when designing computer program applications, and in particular, when designing the user interfaces for the applications. One problem relates to the expected use of the tabbing order by the applications user and the ability of the developer to view, comprehend and change the tabbing order defined during the development process. The difficulty presented by the first problem to the developer increases as the number of visual elements in the user interface increases. During the development of the user interface for an application, which generally requires designing the visual elements, designing the relationships between the visual elements, and selecting the locations of the visual elements in the user interface, the developer preferably needs to review the visual element designs, relationships and locations in the user interface. This includes being able to review the visual elements and the tabbing order of the visual elements in order to insure the accuracy of the tabbing order.

In addition to reviewing, comprehending and changing the tabbing order of the visual elements in a user interface for an application, a developer generally reviews the properties or attributes associated with the visual elements. The properties or attributes may also be referred to as "state" information. Examples of attributes associated with visual elements include the x,y coordinates identifying the location of the visual element on the user interface, the color of the visual element, and the name used by an internal program when referencing the visual element.

A developer generally views and typically sets the attributes and their corresponding values which are associated with a particular visual element. In addition, the attributes and corresponding values for different visual elements also may be reviewed to verify that the attributes and attribute values for a specific group of visual elements are accurate or as intended by the developer.

As the number of visual elements and the number of attributes associated with visual elements increases, the ability of the developer to view and comprehend the visual elements and their corresponding attributes and attribute values decreases. For example, assume that a developer is designing a user interface having a large number of visual elements, with each visual element having a color attribute with its corresponding value in the RGB color format. The color attribute for each element is to be incremented by a count of ten for each successive visual element in the tabbing order. In order to verify that the RGB value for the color property for each successive visual element is incremented by ten, the developer may individually select each visual element and then look at its color attribute in order to view the RGE color value to verify its accuracy. Thereafter, the developer must select each subsequent visual element, look at the color attribute and view the value for the color attribute to verify that the value is incremented by ten over the value for the color attribute for the preceding visual element in the tabbing order. This requires multiple key strokes (e.g., multiple "tab" key selections or multiple mouse "clicks") as well as movement of the attention and eyes of the developer back and forth across the screen.

A number of tools exist for assisting in the development of applications, including tools or methods which assist in the reviewing of the tabbing order. One such tool is the VisualAge programming tool. The VisualAge programming tool is marketed by International Business Machines Corporation ("IBM"), the assignee of the present invention. It assists the developer in defining the tabbing order of visual elements for user interfaces of program applications. In addition, the VisualAge programming tool also permits the user to view the defined tabbing order. In particular, the VisualAge programming tool will display the tabbing order defined by the developer in a textual list which specifies the tabbing order. The textual list may be displayed by accessing a "pop-up" menu. The developer may use the textual list of the tabbing order and, in combination with the actual user interface elements displayed to the user, view the defined tabbing order for the elements. This method for displaying the tabbing order to the developer may be referred to as a "static" approach.

Another "static" method for displaying the tabbing order to the developer is by labeling the visual elements on the user interface. The "labeling" method numerically labels the elements on the editing user interface surface (i.e., the "work space") to identify the tabbing order for the visual elements. The labels which are generally referenced at 200 in FIG. 2, and which may be referred to as "order" tags, identify the tabbing order of the visual elements. The labeling method is illustrated in FIG. 2. Field names such as "name," "address," "telephone" and "credit card" are displayed. In addition, data entry fields associated with each field name are also displayed. Finally, push button elements such as "add" and "delete" are also included on the user interface illustrated in FIG. 2. The numerical labeling which is indicated generally at 10 indicates the tabbing order for the data entry fields.

The visual elements of a user interface also may be grouped. In the example illustrated in FIG. 2, the field names such as "name," "address," "telephone" and "credit card" and their corresponding data entry fields collectively may form one tabbing group while the action elements "add" and "delete" collectively may form a second tabbing group. A distinct tabbing order may be defined within each tabbing group. A detailed description of the labeling method is provided in "Grouping Objects for Tabbing and Cursoring in Visual Programming," by Cox, et al., IBM Technical Disclosure Bulletin, Volume 38, No. 5, May 1995, pages 561–563, the disclosure of which is incorporated herein by reference.

A third methodology for viewing the tabbing order of visual elements of a user interface provides "visually stepping" through the tabbing order using the "tab" key. This method requires the developer to successively press the "tab" key to determine the next visual element in the tabbing order sequence. In order to proceed through the entire tabbing order sequence, the developer must successively press the "tab" key to visually "step" through all of the elements in the tabbing order sequence. This visual "stepping" method may be referred to as a "dynamic" method for viewing the tabbing order of visual elements since the tabbing order is not visually displayed at one instant but rather is viewed "dynamically" by "stepping" through the sequence.

A number of shortcomings are present in the existing visual programming tools and methodologies for reviewing the tabbing order sequence of visual elements. For example, the VisualAge programming tool which provides a textual list of elements in the tabbing order generally requires the developer to make a visual association between the visual elements included in the textual list and the visual elements displayed on the display screen. The labeling methodology which labels each element in a user interface with an "order" tag generally requires the developer to search for and locate each element in the tabbing order. These static visual programming tools and methodologies may result in decreased comprehension of the tabbing order as well as a decrease in the speed and efficiency at which the developer may review, comprehend and/or change the tabbing order. Generally, the decrease in comprehension, speed and efficiency corresponds to an increase in the number of visual elements in the user interface.

The dynamic methodology of visually "stepping" through the elements in the tabbing order by repeatedly pressing the "tab" key requires numerous key strokes, as well as decreases the comprehension factor of the user. Errors which may occur include selecting the "tab" key when it is not otherwise desired. In addition, the speed of the visual "stepping" process may also hinder the developer's ability to comprehend the visual elements in the tabbing order.

These shortcomings of the existing visual programming tools and methods apply equally, whether the developer is reviewing and verifying only the elements in the tabbing order or is also reviewing and verifying one or more sets of attributes associated with the elements of the user interface.

SUMMARY OF THE INVENTION

It is, therefore, an object of the present invention to provide systems, methods and computer program products that enable the efficient development or specification of visual elements for graphical user interfaces and for other components of applications.

It is another object of the present invention to provide systems, methods and computer program products for assisting an application developer in viewing and comprehending visual elements of graphical user interfaces for applications, and also in viewing and comprehending the tabbing order of the visual elements.

It is still a further object of the present invention to provide systems, methods and computer program products which can be used to view and comprehend attributes and attribute values associated with visual elements of graphical user interfaces and other components of program applications.

These and other objects are provided according to the present invention by systems, methods and computer program products for displaying a plurality of visual elements of a graphical user interface and other components associated with an application to a developer. It will be understood by those skilled in the art that the present invention is directed to components of applications, whether or not they are visible to the user of the developed application. The present invention assists a developer in defining the tabbing order for the visual elements, the tabbing order providing the sequence in which the visual elements of the graphical user interface will receive "focus" to enable processing, such as data entry fields for entering data, by the user of the application. The visual elements associated with the application are automatically scanned in the sequential order defined by the tabbing order such that the visual elements are each displayed on the display device and identified (i.e., receive focus) in the sequential order defined by the tabbing order without requiring an indication to display and identify the next visual element in the tabbing order. In other words, the visual elements are automatically scanned with visual elements being highlighted (i.e., receiving focus) individually one at a time in the sequential order defined by the tabbing order without requiring an indication that the next visual element in the tabbing order is to receive focus. As such, the present invention functions in a manner similar to that of the "scan" feature of a car radio which permits a listener to see the digital display and hear each station in succession with a single press of a scan enable button.

The invention is described with respect to a specific visual programming tool; however, the invention is not restricted to any particular visual programming tool or programming environment. Rather, the invention may be applicable to any applications programming environment.

The sequential order of visual elements provided by the tabbing order includes at least a first visual element, a second visual element and a last visual element. The tabbing sequence of the visual elements is automatically shown by displaying (i.e., setting focus on) the first visual element and identifying the first visual element on the display device as the first visual element in the tabbing order. Thereafter, the system continues automatically scanning the visual elements sequentially in accordance with the tabbing order such that each successive visual element in the tabbing order is displayed with focus on the display device and identified as the next visual element in the tabbing order. Finally, the system terminates the automatic tab scanning of the visual elements by displaying the last visual element and identifying the last visual element on the display device with focus on the last element in the tabbing order The length of time that each visual element is to be identified (i.e., receive focus) on the display device also may be defined. As a result, each visual element will receive focus on the display device for the defined length of time before the next visual element in the tabbing order receives focus.

Properties or attributes corresponding to a visual element may also be displayed on the display device and identified concurrently with the visual element receiving focus. Thus, as a visual element is displayed and identified at the appropriate place in the tabbing order, the properties or attributes and the corresponding values associated with the particular visual element, are concurrently displayed and receive focus on the display device.

Finally, the tabbing order may be changed during the automatic scanning of the visual elements. In addition, the attributes or attribute values may be changed while the visual elements and their corresponding attributes and attribute values are automatically scanned sequentially in accordance with the tabbing order.

As a result of the present invention, the developer may easily view, comprehend and change the tabbing order of visual elements for a user interface of a program application as well as any attributes and attribute values associated with the visual elements.

BRIEF DESCRIPTION OF THE DRAWINGS

FIG. 4 is a flow chart illustrating the operational control of the automatic tab scanning system according to the present invention.

DETAILED DESCRIPTION OF THE INVENTION

Figure 1:
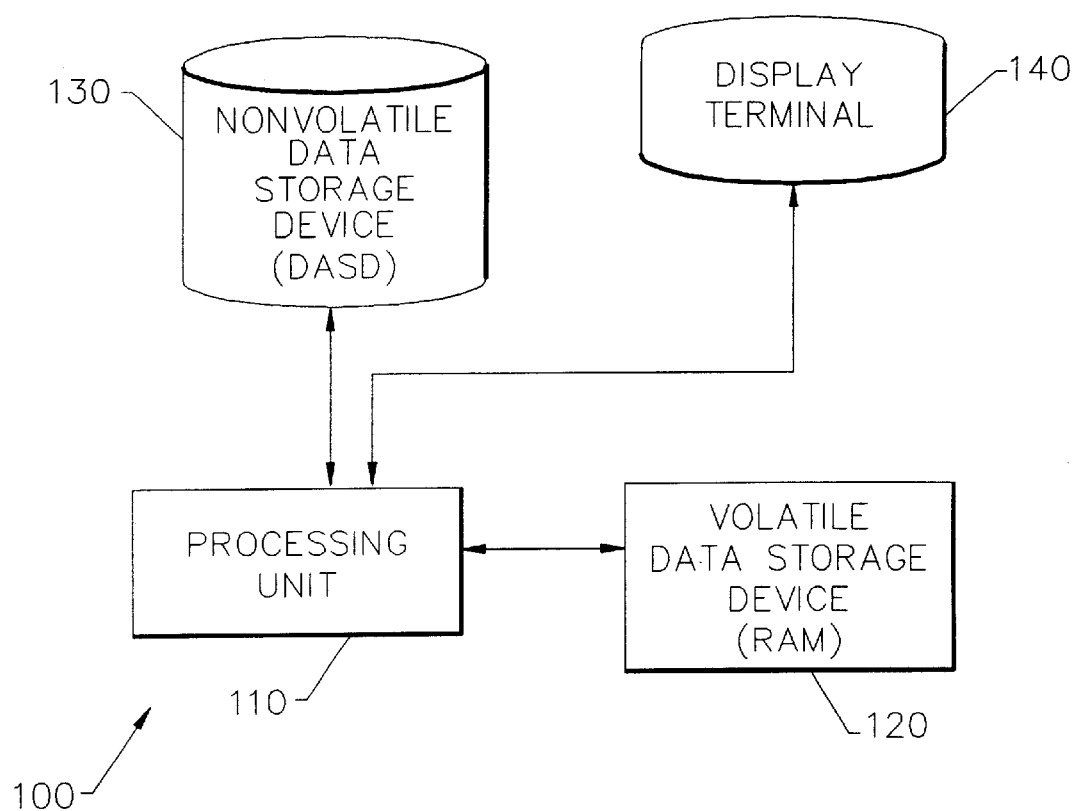
FIG. 1 illustrates a block diagram of a computer environment in which the present invention may operate.
Figure 2:
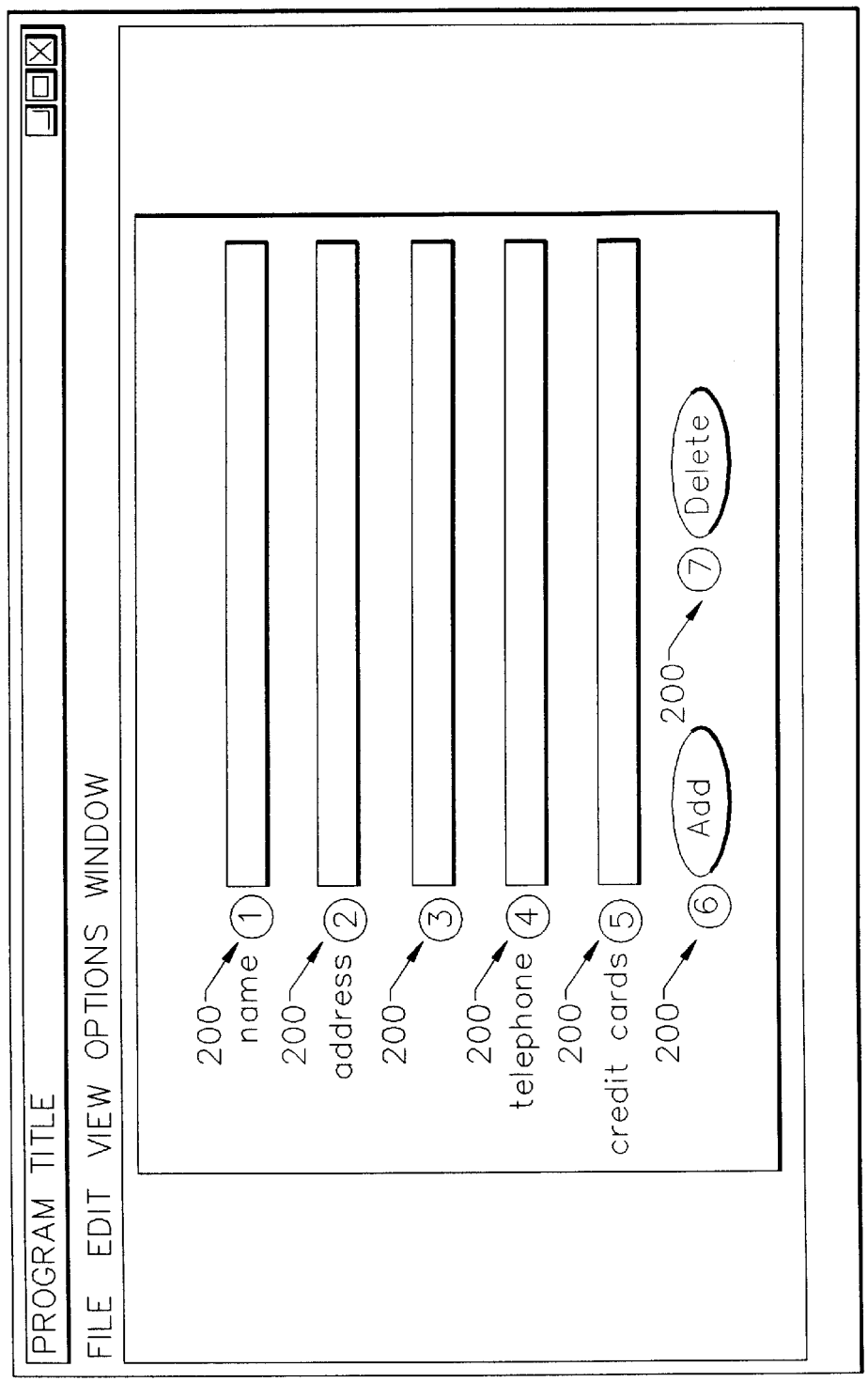
FIG. 2 is a display screen illustrating the labeling method for viewing the tabbing order of visual elements of a user interface.

The present invention will now be described more fully hereinafter with reference to the accompanying drawings, in which a preferred embodiment of the present invention is shown. This invention may, however, be embodied in many different forms and should not be construed as limited to the embodiments set forth herein; rather, this embodiment is provided so that this disclosure will be thorough and complete, and will fully convey the scope of the invention to those skilled in the art. Like numbers refer to like elements throughout.

Overview

The system for automatically scanning the visual elements of a user interface allows a developer to automatically view the tabbing order of visual elements of the user interface in the sequential order defined by the tabbing order. The automatic scanning system assists the user in comprehending the defined tabbing order by successively indicating (i.e., focusing on) each visual element, one at a time, on the display device in the sequence defined by the tabbing order. In essence, when the visual element is to be indicated or receive focus as the next element in the sequence defined by the tabbing order, the visual element is "highlighted" to indicate to the user that the visual element is the next element in sequence.

According to the present invention, the automatic scanning of the visual elements in the tabbing order is initiated and then the visual elements tab sequence are observed. In addition to indicating that a visual element is the next element in sequence in the tabbing order, the system also may display the state information (i.e., properties or attributes) associated with a visual element concurrently with the corresponding visual element receiving focus. Attributes may include, for example, the x,y coordinates identifying the location of the visual element on the user interface work space, the color of a visual element, or the name of the visual element referenced by an internal program. The attributes may be displayed in a window adjacent to the corresponding visual element which is indicated or highlighted as being the next visual element in the sequence defined by the tabbing order. It will be understood by those skilled in the art that the attribute window may be laid over top of the work space so that the attribute window appears directly next to the corresponding visual element.

In addition, the length of time that a visual element, and any corresponding attributes, receive focus may also be defined. This length of time may be referred to as the "tabbing interval" or the "focus interval." By defining the length of time that the visual element and its corresponding attributes are receiving focus or are highlighted, the element and its corresponding attributes will be highlighted for the defined length of time before focusing on or highlighting the next visual element in sequence. By increasing the length of time, the developer's ability to view and comprehend the visual element, its attributes as well as its location in the sequence of the tabbing order may be increased. Alternatively, by decreasing the focus interval, the speed at which a developer can review the tabbing order may be increased. Thus, if the number of visual elements in the sequence is minimal or if the number of attributes associated with the visual elements are minimal, the tabbing interval may be decreased. Alternatively, as the number of visual elements or attributes associated with the visual elements is increased, the tabbing interval may be increased in order to permit additional time for review and comprehension.

The present invention also permits changes to be made to the tabbing order as well as changes to the attributes or the attribute values. For example, when a visual element is highlighted, the attributes and corresponding values for the attributes, which are associated with the visual element, are displayed. Attributes may be of a number of different types such as an x,y coordinate, text label or a color.

If a developer wants to confirm that each of a number of different visual elements have the same attributes (e.g., the same ten text labels and ten entry fields), the developer can automatically scan through the visual elements and the attributes corresponding to the visual elements to review and verify that the attributes associated with each element are consistent. In addition, the developer may also use the automatic tab scanning system according to the present invention to review and confirm that the values associated with one particular attribute are the same for all visual elements or accurately reflect the original definition of those values. For example, if the developer originally designed the values for a color attribute to increment by a count of ten from one visual element to the next, the developer can automatically tab scan the visual elements and the color attribute value using the present invention to confirm that the color attribute value increments by ten from one visual element to the next.

In the preferred embodiment, the automatic scanning process can be initiated by selecting the "tab" key in combination with another modifier key such as the "control" key. The automatic scanning process may continue either through the entire sequence of visual elements in the tabbing order, or may be stopped at any time by selecting another designated key. Alternatively, the developer may select a subset of the visual elements in the tabbing order to be reviewed and only the visual elements in the selected subset will be automatically scanned.

Detailed Operation: Automatic Scanning

Referring now to FIGS. 3A–3D, the processing of the automatic tab scanning system according to the present invention will now be described from the developer's visual perspective. FIGS. 3A–3D illustrate an example of the processing of the automatic tab scanning system according to the present invention in which the visual elements in the tabbing order are four "buttons." The four buttons representing the visual elements are displayed in the work space window 306 of FIGS. 3A–3D.

The development interface screen displays illustrated in FIGS. 3A–3D have a traditional format of a "windows" environment including a title bar at 302, and pull-down menus such as "file," "edit" and "view" at 304. The development screen interface according to the present invention has, in addition to the standard format of a windows display, an editing surface or work space 306 which is the "white space" on which the developer designs and lays out the user interface for the applications program. A component palette 308 provides the templates for the types of the visual elements. Finally, FIGS. 3A–3D also illustrate the attribute window at 310.

Figure 3A:
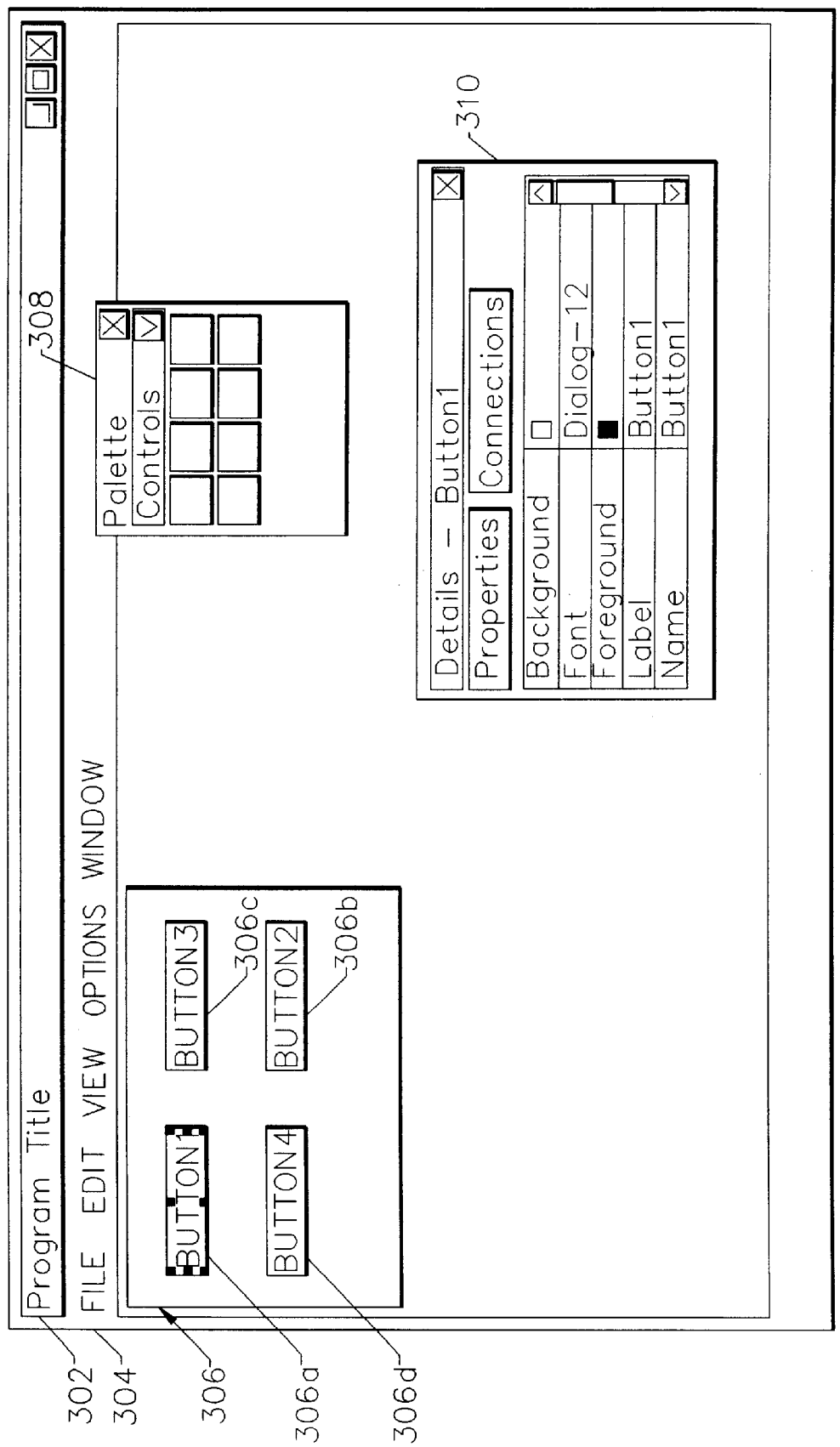
FIGS. 3A–3D are display screens illustrating the automatic tab scanning system according to the present invention.

In the example illustrated in FIGS. 3A–3D for the tab scanning system according to the present invention, the developer has laid out a group of four visual items or elements in the work space 306. The visual elements are "Button 1" 306a, "Button 2" 306b, "Button 3" 306c and "Button 4" 306d. After laying out the buttons, the defined tabbing order would be "Button 1" 306a, "Button 2" 306b, "Button 3" 306c, and "Button 4" 306d. After selecting the various visual elements and the tabbing order, the developer at a later time decides to review the tabbing order to verify that the tabbing order is correct for when the application under development is deployed to the end users of the application. The developer presses the "tab" key in conjunction with the "control" key. In response, as illustrated in FIG. 3A, "Button 1" 306a is highlighted (receives focus) in work space 306 indicating that Button 1 is the first visual element in the sequence defined by the tabbing order. In addition, in this particular example, the attribute window 310 is also displayed for Button 1. Once Button 1 has been highlighted for the defined tab interval and the attribute window 310 has been displayed in conjunction with Button 1 for the defined tab interval, the next visual element in the sequence defined by the tabbing order will receive focus in work space 306.

Figure 3B:
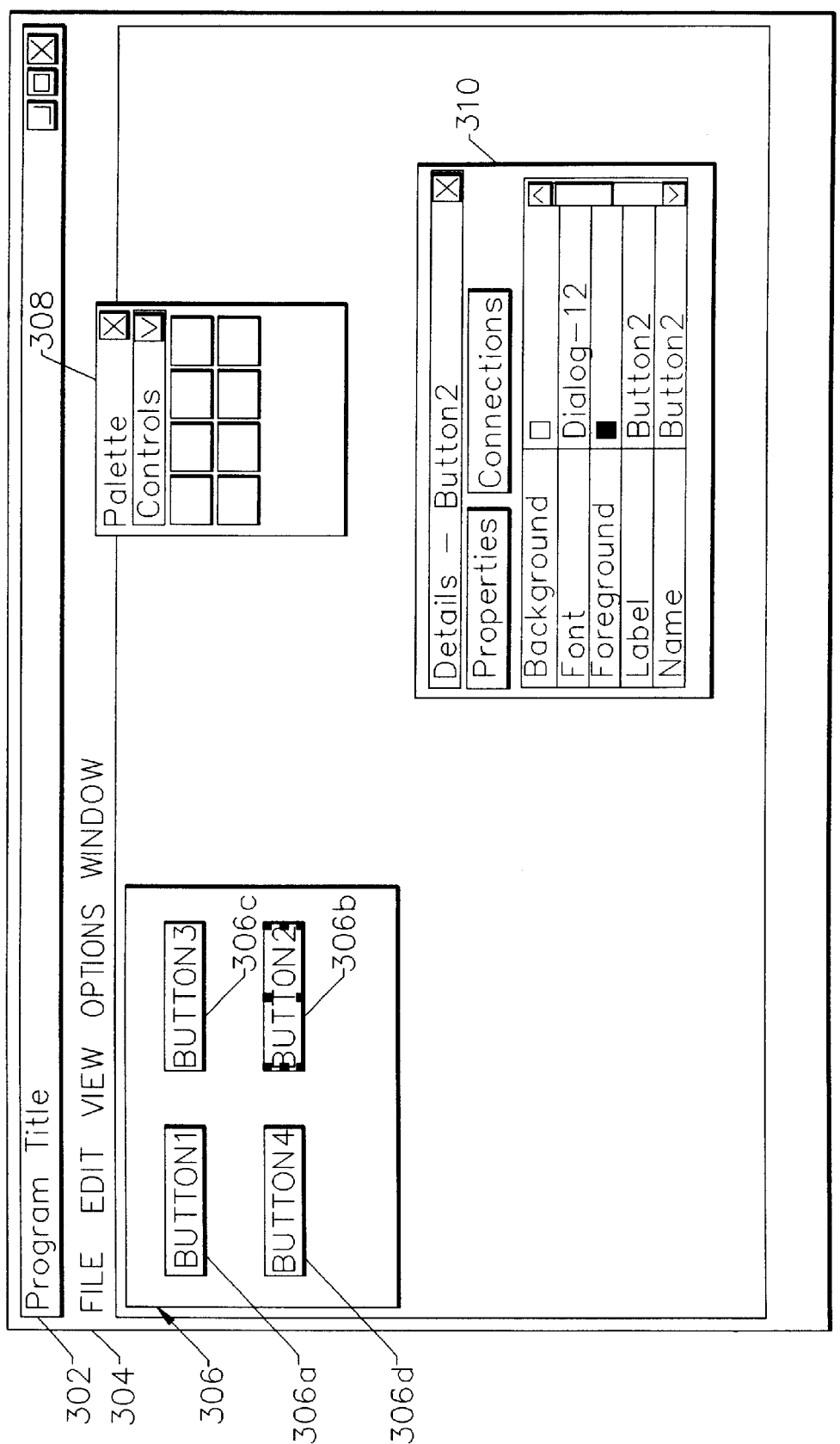

Referring to FIG. 3B, Button 2 306b receives focus indicating that it is the next visual element in the sequence defined by the tabbing order. In addition, attribute window 310 is changed to reflect the attributes and the attribute values corresponding to Button 2. For example, the attribute "values" for the attribute "label" and "name" both have been changed to "Button 2." Button 2 306b will receive focus and the attribute window 310 corresponding to Button 2 306b will be displayed for the length of the tab interval.

Figure 3C:
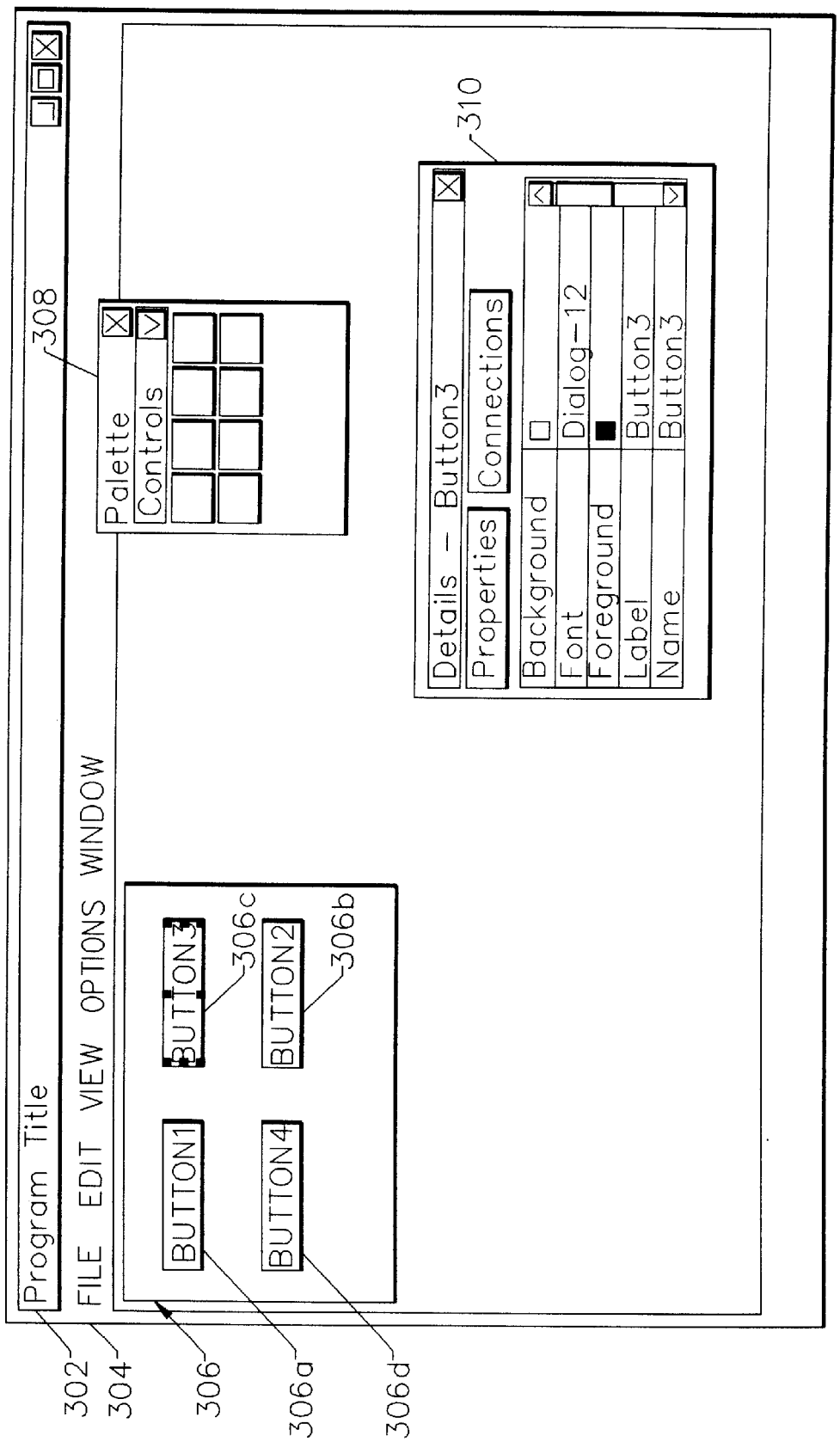

Once the tab interval has lapsed, the next visual element in the sequence defined by the tabbing order is determined to be Button 3 306c. As illustrated in FIG. 3C, Button 3 306c receives focus in work space 306. In addition, attribute window 310 is changed to reflect the attributes and attribute values associated with Button 3 306c. For example, the attribute values for the attributes "label" and "name" both are changed to "Button 3" as illustrated at 310 in FIG. 3C.

Button 3 306c is focused on in the work space 306 and the attribute window corresponding to Button 3 306c is displayed at 310 for the duration of the tab interval.

Figure 3D:
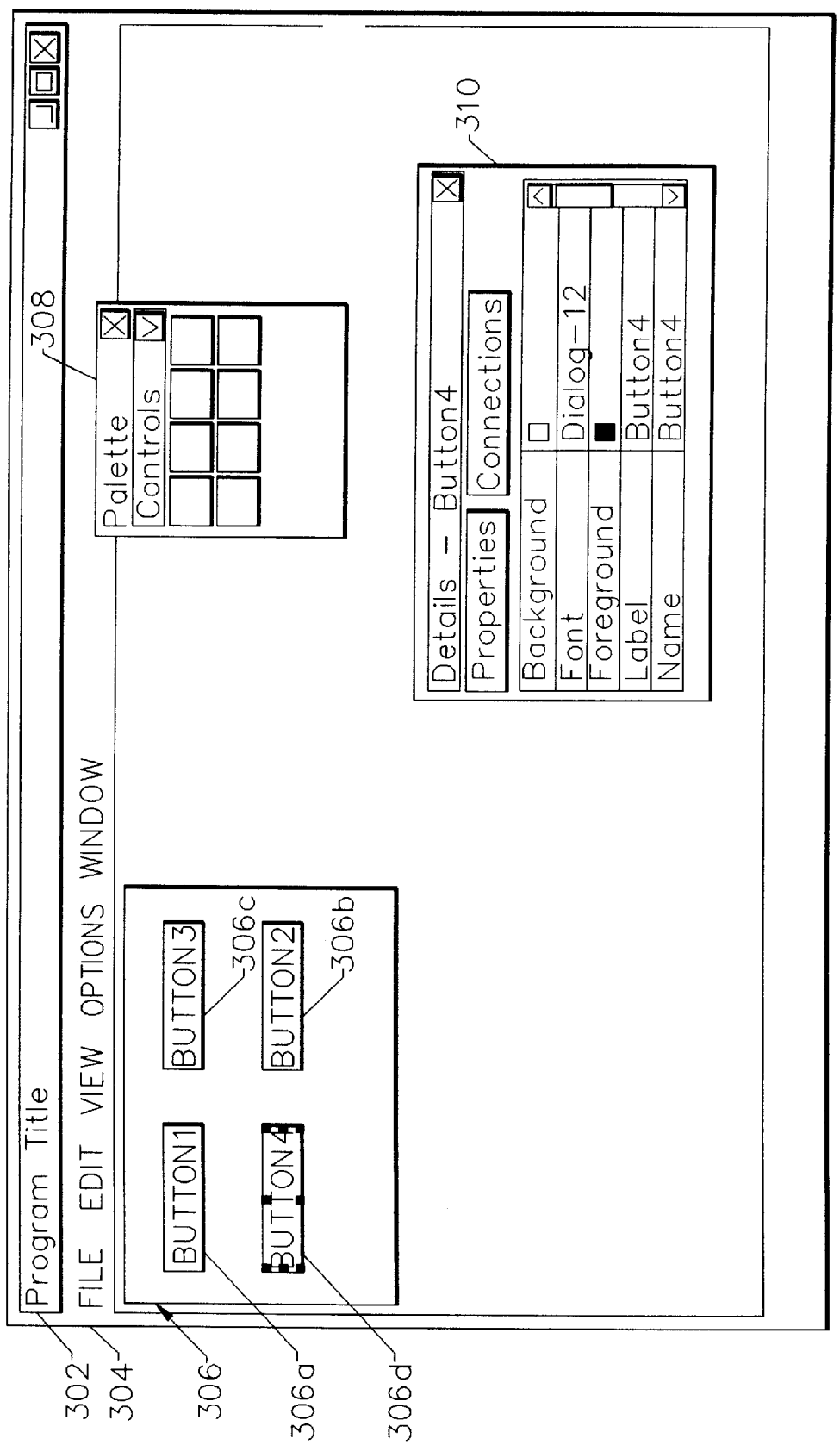

After the tab interval lapses, the next visual element in the sequence defined by the tabbing order is determined to be Button 4 306d. As a result, Button 4 306d receives focus in the work space 306 as illustrated in FIG. 3D. In addition, the attribute window is changed to reflect the attributes and attribute values associated with the visual element Button 4 306d. For example, the attribute values corresponding to the attribute's "label" and "name" both are changed to "Button 4."

It will be understood by those having skill in the art that although the work space illustrated in FIGS. 3A–3D displays a single user interface having only four visual elements, the present invention permits the viewing, comprehension and modification of more than one user interface for an application having numerous, varied types of visual elements as well as numerous and varied attributes and attribute values. For example, the present invention may be used to view, comprehend and modify a single user interface having as many as twenty or more visual elements of varying types such as entry fields, text labels and push buttons as well as a single user interface which is actually the combination of three user displays having numerous visual elements, and corresponding attributes and attribute values.

FIG. 4 is a flow chart illustrating the methods, systems, and program products according to the present invention. It will be understood that each step of the flow chart, and combinations of the steps in the flow chart diagram, can be implemented by computer program instructions. These computer program instructions may be loaded onto a computer or other programmable data processing apparatus to produce a machine such that the instructions which execute on the computer or other programmable apparatus create means for implementing the functions specified in the flow chart step(s). These computer program instructions may also be stored in a computer readable memory that can direct a computer or other programmable apparatus to function in a particular manner, such that the instructions stored in the computer readable memory produce an article of manufacture including instruction means which implement the functions specified in the flow chart step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart step(s).

Accordingly, steps of the flow chart illustrations support combinations of means for performing the specified functions, combinations of steps for performing the specified functions and program instruction means for performing the specified function. It will also be understood that each step of the flow chart illustrations, and combinations of steps in the flow chart illustrations, can be implemented by special purpose hardware based computer systems which perform the specified functions or steps, or combinations of special purpose hardware and computer instructions.

Referring now to FIG. 4, a flow chart illustrating the operations of the present invention for automatically scanning the visual elements of a program application will now be described. Processing begins with the identification of the visual components or elements of the tabbing order to be scanned at 402. The developer may select to scan all of the visual elements in the tabbing order or only a subset of the visual elements. A determination is then made at 404 as to whether the developer wants to tab through the visual elements in a regular tab sequence at 404 by individually selecting the next element in sequence by selecting the "tab" key. If it is determined at 404 that the developer selected only the "tab" key indicating that the developer wants to view the next element in sequence using the conventional tabbing process, the system then proceeds at 406 to process the regular tab function for the next element in the tabbing order and then displays and highlights (i.e., focuses on) the next element in the tabbing order at 408 thereby indicating that the highlighted element is the next element in the tabbing order.

The developer may also display the attribute window corresponding to the current element. As a result, a determination is made at 410 as to whether the attribute window corresponding to the current element is to be displayed. If it is determined at 410 that the attribute window is to be displayed, the attribute window for the corresponding element is updated at 412 in order to include the values for the attributes for the current (or next) element in sequence in the tabbing order. If it is determined at 410 that the attribute window is not to be displayed, then control is transferred to block 402.

If it is determined at 404 that the developer did not select the regular "tab" key, a determination is made at 420 as to whether auto tab or auto scan has been selected. If it is determined that auto tab or auto scan was not selected, control is returned to 404 waiting for a selection as to the type of tabbing or scanning process desired by the developer. If it is determined at 420 that auto tab or auto scan processing was selected by the developer, the developer then can define the tab or focus interval at 422 to set the length of time for which each individual visual element will be highlighted or receive focus thereby indicating it as the next visual element in the sequence in the tabbing order. Thereafter, the tabbing interval clock is reset to zero at 424.

The present invention then processes the tabbing function to determine the next element in the sequence of the tabbing order at 426. The identified element then receives focus by highlighting at 428 indicating that it is the next element in the sequence in the tabbing order.

Similar to processing in the conventional tabbing system, the developer may display the attribute window corresponding to the highlighted element. A determination is made at 430 as to whether the developer has indicated that the attribute window corresponding to the currently highlighted element is to be displayed. If the attribute window is to be displayed, the attribute window is updated at 432 to include the attributes and attribute values for the next element in sequence in the tabbing order. Processing then continues at 434. If it was determined at 430 that the attribute window was not to be displayed, then processing also continues at 434 by continuing to highlight the current visual element in the sequence in the tabbing order (and the corresponding attribute window, if it is to be displayed), until the tabbing interval clock value equals the defined tabbing interval.

Finally, a determination is made as to whether auto tab or auto scan processing has been stopped by the developer at 436. If it is determined at 436 that auto tab or auto scan processing has not been stopped, a determination is made at 414 as to whether the entire sequence of elements has been scanned. If it is determined at 414 that the entire sequence of elements has been scanned, control is returned to block 402 for identification of new elements to be scanned. If it is determined at 414 that not all of the elements have been scanned, control is transferred to block 424 to reset the tabbing interval clock for automatically scanning to the next element in the tabbing order. If it is determined at 436 that auto tab or auto scan processing was stopped by the developer, then control is returned to 402.

In the drawings and specification, there have been disclosed typically preferred embodiments of the preferred invention and, although specific terms are employed, they are used in a generic and descriptive sense only and not for purpose of limitation, the scope of the invention being set forth in the following claims.

What is claimed is:

1. A method for displaying a plurality of visual elements associated with a computer program application, said method comprising the steps of:
   defining a tabbing order for the plurality of visual elements, wherein said tabbing order comprises a sequential ordering of the visual elements; and
   automatically sequentially identifying on a display device the visual elements one at a time, in the sequential order defined by the tabbing order, without requiring user selection of a next visual element in the tabbing order to be displayed and identified so as to display the tabbing order of the visual elements to a user.

2. The method according to claim 1, further comprising the step of:
   terminating the identification of visual elements after a last visual element in the tabbing order is identified on the display device.

3. The method according to claim 1, wherein said sequential order represents an ordering of the visual elements such that a first visual element of the plurality of visual elements is first in the tabbing order and a second visual element of the plurality of visual elements is second in the tabbing order; and wherein said automatic identification step comprises the steps of:
   defining a length of time a visual element is identified on the display device; and
   identifying the first visual element on the display device for a period of time corresponding to the defined length of time before identifying the second visual element in the tabbing order on the display device.

4. The method according to claim 1, wherein each of said visual elements has at least one property associated therewith, and wherein said automatic identification step comprises the step of concurrently displaying the at least one property associated with a visual element on the display device and identifying the visual element on the display device.

5. The method according to claim 4, wherein one of said properties is a RGB value.

6. The method according to claim 4, wherein said method further comprises the step of changing the at least one property.

7. The method according to claim 1, wherein each of said visual elements is identified in the sequential order defined by the tabbing order by setting focus on each visual element in the sequential order defined by the tabbing order.

8. The method according to claim 1, said method further comprising the steps of:
   selecting a first of said visual elements;
   identifying the selected first visual element on the display device;
   selecting a second of said visual elements, and identifying the selected second visual element on the display device;
   wherein the selected second visual element follows the selected first visual element in the sequential order defined by the tabbing order.

9. The method according to claim 1, wherein said method further comprises the step of changing the tabbing order.

10. A system for displaying on a display device a plurality of visual elements associated with a computer program application, said system comprising:
    means for defining a tabbing order for the plurality of visual elements, wherein said tabbing order comprises a sequential ordering of the visual elements; and
    means for automatically sequentially identifying on a display device the visual elements one at a time, in the sequential order defined by the tabbing order without requiring user selection of a next visual element in the tabbing order to be identified on the display device so as to display the tabbing order of the visual elements to a user.

11. A system according to claim 10, further comprising means for terminating the identification of visual elements after a last visual element in the tabbing order is identified on the display device.

12. A system according to claim 10, wherein said sequential order represents an ordering of the visual elements such that a first visual element of the plurality of visual elements is first in the tabbing order and a second visual element of the plurality of visual elements is second in the tabbing order; and wherein said means for automatic identification comprises:
    means for defining a length of time a visual element is identified on the display device; and
    means for identifying the first visual element on the display device for a period of time corresponding to the defined length of time before identifying the second visual element in the tabbing order on the display device.

13. A system according to claim 10, wherein each of said visual elements has at least one property associated therewith, and wherein said means for automatic identification comprises means for concurrently displaying the at least one property associated with a visual element on the display device and identifying the visual element on the display device.

14. A system according to claim 13, wherein one of said properties is a RGB value.

15. A system according to claim 13, further comprising means for changing the at least one property.

16. A system according to claim 10, wherein each of said visual elements is identified in the sequential order defined by the tabbing order by setting focus on each visual element in the sequential order defined by the tabbing order.

17. A system according to claim 10, further comprising:
    means for selecting a first plurality of the visual elements; and
    wherein said means for automatic identification comprises means for automatically identifying the selected first plurality of visual elements in the sequential order defined by the tabbing order, wherein said selected first plurality of visual elements are each identified on the display device in the sequential order defined by the tabbing order without requiring user selection of a next visual element in the tabbing order to be identified on the display device.

18. A system according to claim 10, further comprising:

means for selecting a first of said visual elements;

means for identifying the selected first visual element on the display device;

means for selecting a second of said visual elements, and identifying the selected second visual element on the display device;

wherein the selected second visual element follows the selected first visual element in the sequential order defined by the tabbing order.

19. A system according to claim 10, further comprising means for changing the tabbing order.

20. A computer program product for displaying a plurality of visual elements associated with a computer program application, said computer program product comprising:

a computer readable storage medium having computer readable code means embodied in said medium, said computer readable code means comprising:

computer instruction means for defining a tabbing order for the plurality of visual elements, wherein said tabbing order comprises a sequential ordering of the visual elements; and computer instruction means for automatically sequentially identifying on a display device the visual elements one at a time, in the sequential order defined by the tabbing order, without requiring user selection of a next visual element in the tabbing order to identified on the display device so as to display the tabbing order of the visual elements to a user.

21. A computer program product according to claim 20, further comprising means for terminating the identification of visual elements after a last visual element in the tabbing order is identified on the display device.

22. A computer program product according to claim 20, wherein said sequential order represents an ordering of the visual elements such that a first visual element of the plurality of visual elements is first in the tabbing order and a second visual element of the plurality of visual elements is second in the tabbing order; and wherein said computer readable program code means for automatic identification comprises:

computer readable program code means for defining a length of time a visual element is identified on the display device; and computer readable program code means for identifying the first visual element on the display device for a period of time corresponding to the defined length of time before identifying the second visual element in the tabbing order on the display device.

23. A computer program product according to claim 20, wherein each of said visual elements has at least one property associated therewith, and wherein said computer readable program code means for automatic identification comprises computer readable program code means for concurrently displaying the at least one property associated with a visual element on the display device and identifying the visual element on the display device.

24. A computer program product according to claim 23, wherein one of said properties is a RGB value.

25. A computer program product according to claim 23, further comprising computer readable program code means for changing the at least one property.

26. A computer program product according to claim 20, wherein each of said visual elements is identified in the sequential order defined by the tabbing order by setting focus on each visual element in the sequential order defined by the tabbing order.

27. A computer program product according to claim 20, further comprising:

computer readable program code means for selecting a first plurality of the visual elements; and wherein said computer readable program code means for automatic identification comprises computer readable program code means for automatically identifying the selected first plurality of visual elements in the sequential order defined by the tabbing order, wherein said selected first plurality of visual elements are each identified on the display device in the sequential order defined by the tabbing order without requiring user selection of a next visual element in the tabbing order to be identified on the display device.

28. A computer program product according to claim 20, further comprising:

computer readable program code means for selecting a first of said visual elements;

computer readable program code means for identifying the selected first visual element on the display device;

computer readable program code means for selecting a second of said visual elements, and identifying the selected second visual element on the display device;

wherein the selected second visual element follows the selected first visual element in the sequential order defined by the tabbing order.

29. A computer program product according to claim 20, further comprising computer readable program code means for changing the tabbing order.

* * * * *